(12) United States Patent
Siu

(10) Patent No.: US 6,429,409 B1
(45) Date of Patent: Aug. 6, 2002

(54) TABLE TOP COOKING APPLIANCE

(75) Inventor: Angel Mei Lin Siu, Hong Kong (HK)

(73) Assignee: Theresa International Limited (HK)

(*) Notice: Subject to any disclaimer, the term of this patent is extended or adjusted under 35 U.S.C. 154(b) by 0 days.

(21) Appl. No.: 09/756,367

(22) Filed: Jan. 8, 2001

(51) Int. Cl.[7] .............. H05B 3/68; H05B 3/06; A47J 3/00
(52) U.S. Cl. .............. 219/450.1; 219/451.4; 219/524; 99/372; 99/378
(58) Field of Search .............. 219/446.1, 448.11, 219/450.1, 451.1, 447.1, 524, 538; 99/331, 336, 339, 340, 372, 376, 378, 379

(56) References Cited

U.S. PATENT DOCUMENTS

| | | | | |
|---|---|---|---|---|
| 3,068,778 A | * | 12/1962 | Majerus | 99/375 |
| 3,172,999 A | * | 3/1965 | Sutton et al. | 219/524 |
| 4,091,720 A | * | 5/1978 | Wheeler | 219/524 |
| 4,241,289 A | * | 12/1980 | Bowling | 219/448.14 |
| 4,307,287 A | * | 12/1981 | Weiss | 219/442 |
| 4,669,373 A | * | 6/1987 | Weimer et al. | 219/524 |
| 5,380,986 A | * | 1/1995 | Mullen | 219/472 |
| 6,130,416 A | * | 10/2000 | Gabbai | 219/524 |
| 6,150,635 A | * | 11/2000 | Hannon et al. | 99/378 |

* cited by examiner

Primary Examiner—Sang Paik
(74) Attorney, Agent, or Firm—Jackson Walker L.L.P.

(57) ABSTRACT

A removable platen for a sandwich maker is heated by an electric heating element embedded in a supporting platform. The platform has an upstanding channel that surrounds the electric heating element and the platen has an integrally formed footprint that fits snugly against the upstanding channel. This provides a good heat exchanging contact surfaces for conducting heat from the heating element to the platen in use, even though the platen can he removed for cleaning and washing.

9 Claims, 5 Drawing Sheets

TABLE TOP COOKING APPLIANCE

BACKGROUND OF THE INVENTION

1. Field of the Invention

The invention relates to table top cooking appliances.

2. Description of Prior Art

The invention relates to cooking appliances that typically stand on a table top such as a work surface in a kitchen. The invention has particular application to a toasted sandwich makers or any appliance when it is appropriate or useful to remove heating plates or cooking containers (as in a deep fryer) for separate cleaning and washing that advantageously allows the plates or containers to be completely immersed in water. Although the term 'sandwich maker' is commonly used for certain types of appliances, it is usually for the same appliance to be used for pie making, waffle making, griddle scone making and the like. In any event the term 'sandwich maker' will be used in this specification for any relatively small electrically heated appliance, having a hinged lid that closes over the foodstuff. A heated plate or platen is provided in a base and often in a hinged lid as well. The lid is closable over the base and cooking (e.g. toasting) of foodstuffs takes place between the lid and the base when the lid is closed.

In sandwich makers of the prior art, if the heated platens and not removable, it is difficult to clean the platens. This is because heating elements in the sandwich maker cannot be wetted and certainly not immersed in water to wash the platens clean. This problem has been overcome or reduced by having removable or disposable liners for the platens that can be removed and washed, or disposed of, respectively. In the former case especially, there is a difficulty or an expense in preparing suitably configured liners for ensuring good heat transfer between the heated platens and the liner. When the liners are disposable, the procedure required to wholly remove the liner is not always efficient, in that parts of the liner may stick to the heated platen, and selecting suitable liner material is neither easy or cheap in many instances.

SUMMARY OF THE INVENTION

It is an object of the invention to overcome or to at least reduce these problems.

According to the invention there is provided . . .

BRIEF DESCRIPTION OF THE DRAWINGS

A sandwich maker and a fryer according to the invention will now be described by way of example with reference to the accompany drawings in which.

DESCRIPTION OF THE PREFERRED EMBODIMENT

Figure 1:
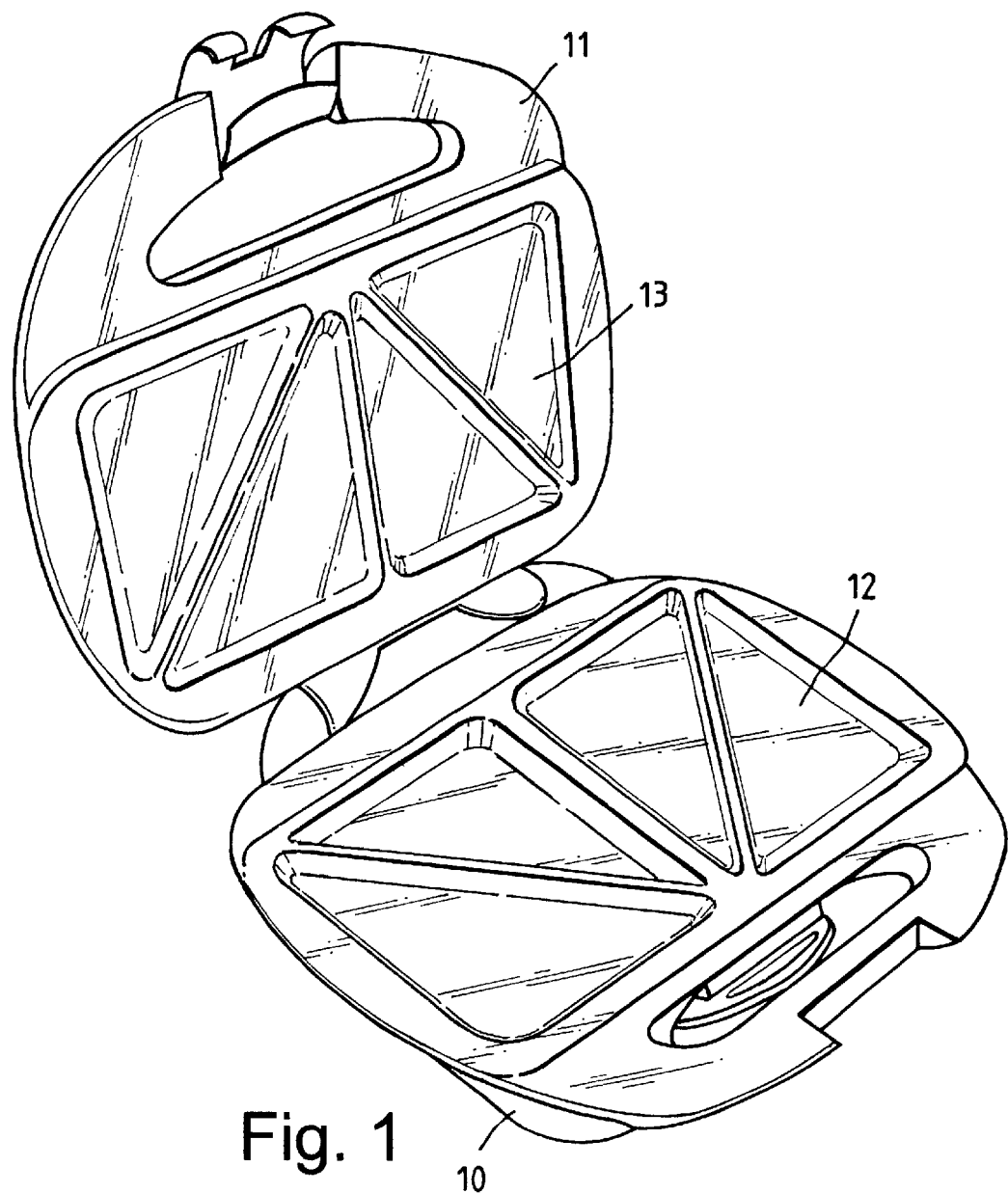
FIG. 1 is an isometric view of the sandwich maker.

Referring to the drawings, in FIG. 1 the sandwich maker includes a base 10 and a hinged lid 11. Removable aluminium alloy platens 12 and 13 are supported on the base and the lid respectively. The platens are shaped for retaining (four) sandwiches between the platens when the lid is closed. According to well-known arrangements, when the platens are heated the sandwiches are toasted and the contents of the sandwich cooked to some extent in most cases. When the sandwiches are ready, usually after a timed heating cycle, the lid is manually lifted and the sandwiches are removed. The sandwich maker also includes a thermostat and other safety features, and a controller, known in the art but not shown in FIG. 1. The platens are of self-supporting (robust) material and are releasable so that the platens can be easily removed for cleaning, when separated from the rest of the sandwich maker.

Figure 2:
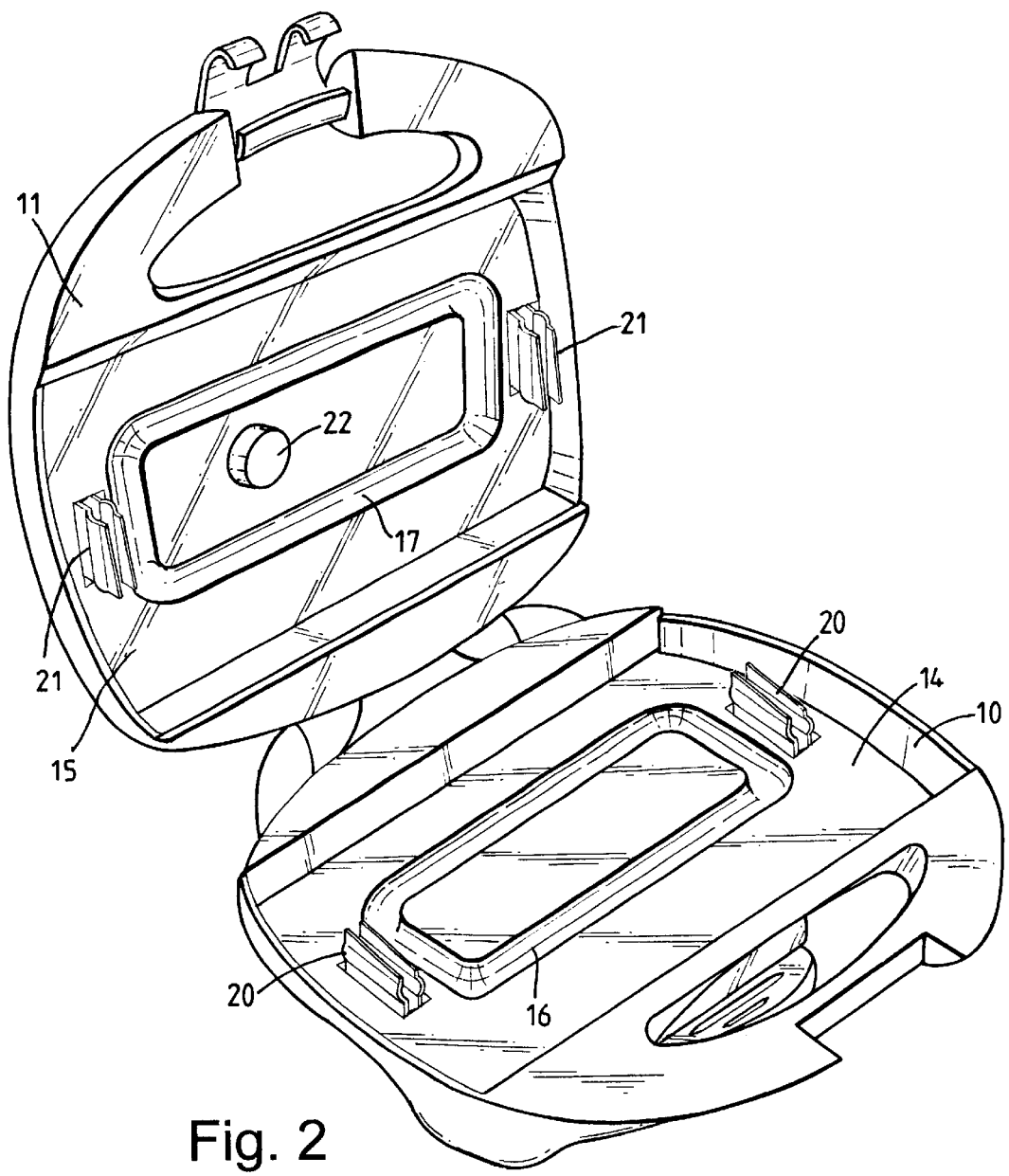
FIG. 2 is an isometric view of the sandwich maker with heatable platens removed.
Figure 3:
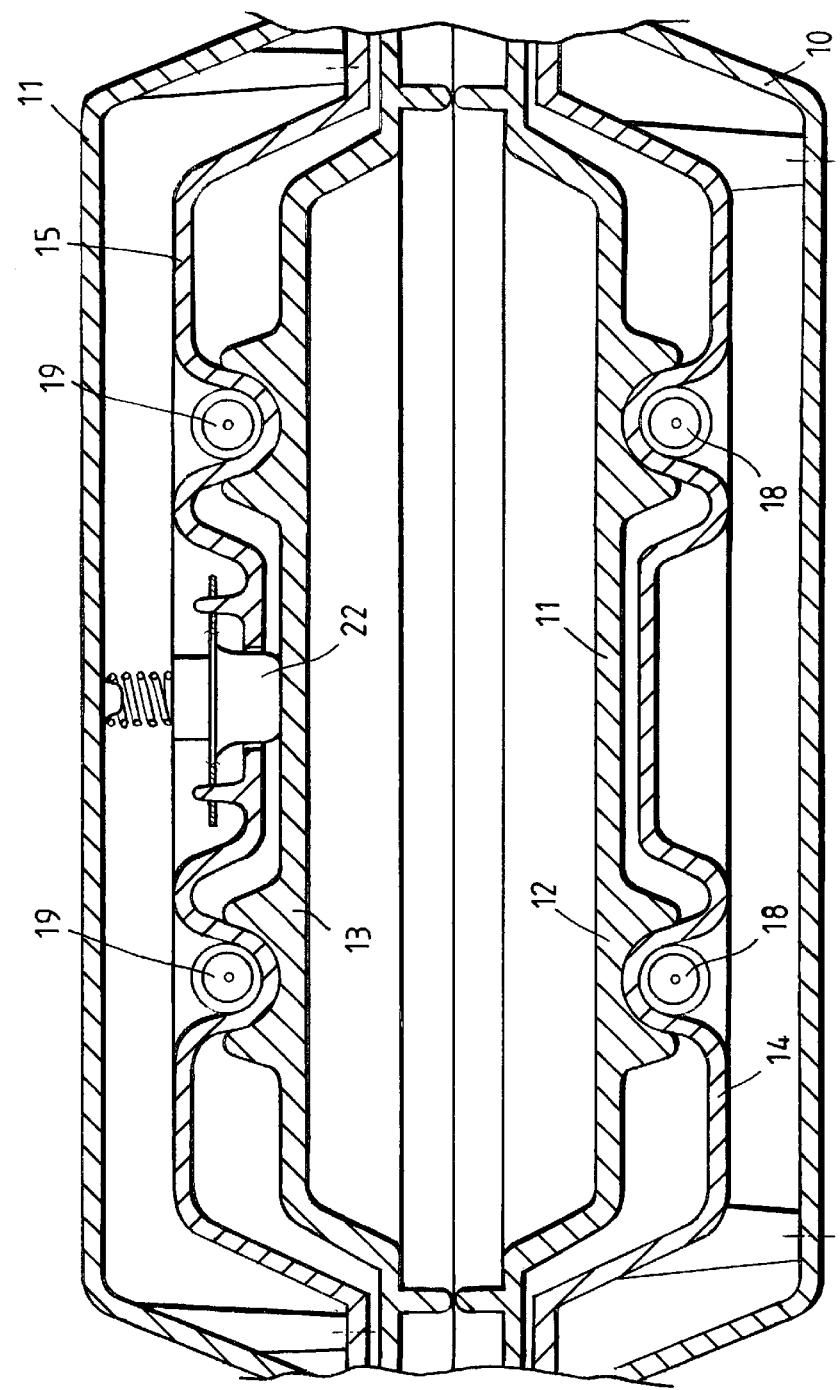
FIG. 3 is a cross-sectional electric of the sandwich maker.

In FIG. 2, the platens have been removed and support platforms 14 and 15 can be seen mounted in the base 10 and in the lid 11, respectively. The platforms have generally planar exposed surfaces formed with upstanding channels 16 and 17. Electric heating elements 18 and 19 are embedded under and in the channels (as seen in FIG. 3). Pairs of spring clips 20 and 21 are provided for releasably retaining the platens in position in the sandwich maker. A thermal sensor probe 22 is mounted in the lid 11 (but could be mounted in the base) and exposed through a central aperture in the platform 15 for triggering a thermostat (not shown) in a well-known manner. Generally, the probe 22 will contact the upper surface of the platen 13 during normal use. The probe may be resilient biased, by a light spring, say, to ensure good physical contact with the platen 13.

Figure 4:
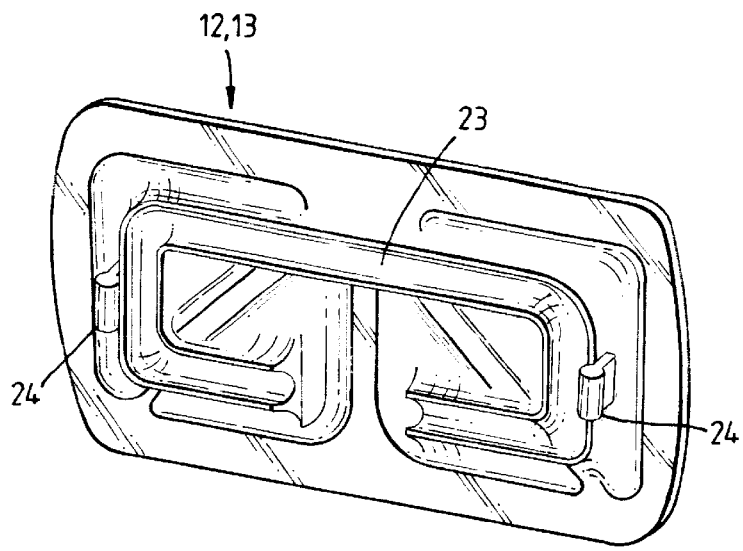
FIG. 4 is an isometric underside view of a platen.

In FIG. 4, one platen 12 (or 13) is shown. The platens each have an integrally formed footprint 23 in their undersurfaces that fit snugly in use against the respective channels 16 and 17, This is clearly shown in FIG. 4. The platens also have a pair of shaped tongues 24 for engaging with the clips 20 and 21, as appropriate.

It will be noted that the footprint 23 has an arcuate lateral cross-section (see FIG. 3) so that the platens sit snugly onto the tops of the channels 16 and 17 other than at the footprint, the platens are somewhat separated from the platforms. This ensures that continuous physical contact is always established between the whole of the region formed by surfaces of the footprints and of the channels. It can been clearly seen in FIG. 3, that the formations 16 and 17 effectively surround the respective heating elements and that the footprint 23 virtually surrounds the channels 16 and 17. This is to provide good heat exchanging/conducting conditions between the electric heating elements and the platens.

Although heat will also radiate between other parts of the platforms and the platens in normal use, the heat is mainly transferred via the footprints. This is particularly the case in the described embodiment because the platen is relatively deep and made of good conductive material. Also the footprint is surrounded by a substantial body of solid platen material that heats up quickly in use and conducts heat rapidly to the rest of the platen.

Figure 5:
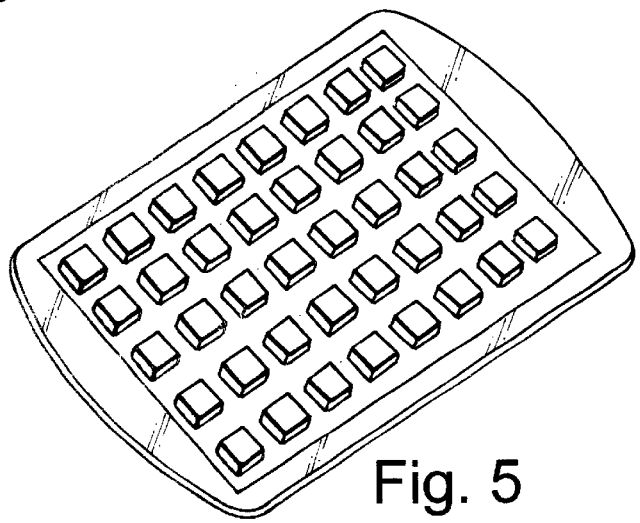
FIG. 5 is an isometric view of a waffle making platen.
Figure 6:
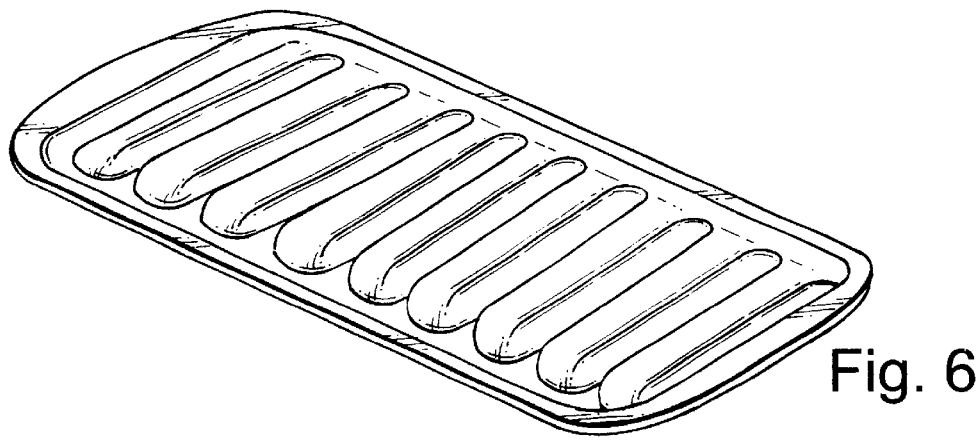
FIG. 6 is an isometric view of a griddle plate platen.

A waffle making platen is shown in FIG. 5 and a griddle platen is shown in FIG. 6. A pie making platen is also possible. In each case the platens are made, conveniently by molding, and integrally formed with a footprint as shown at 23 in FIG. 4. As such is the 'sandwich maker' can be used for preparing various different foods by selecting one of the platen types shown in Figures.

If a more convoluted shaped electric element is required, the channels in the support platforms, if present, and the footprints are suitably formed and shaped to envelope and fit snugly against such an electric element as required.

Figure 7:
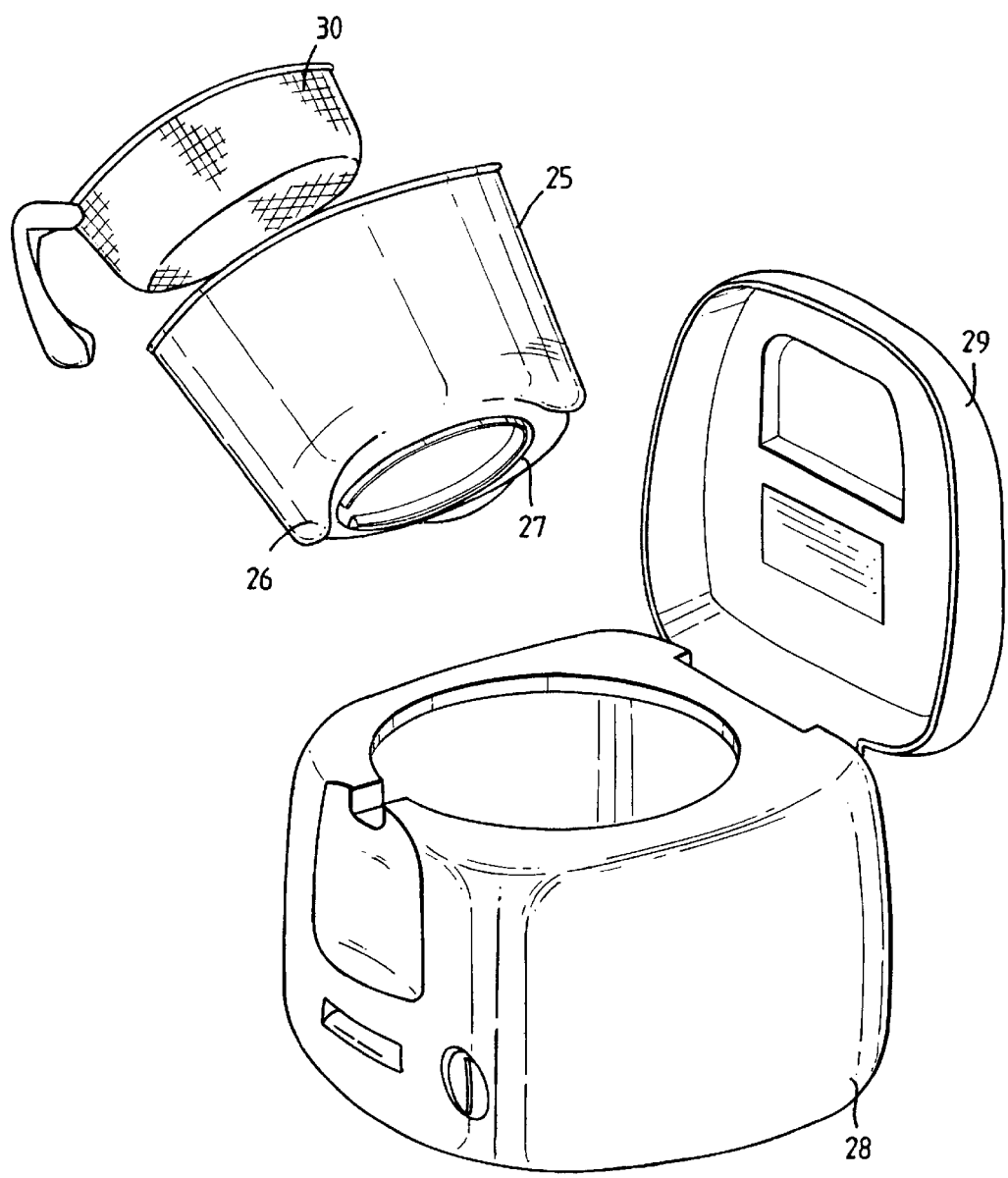
FIG. 7 is an isometric exploded view of a fryer.

It is possible for the footprint 23 to be arranged to rest directly on suitably supported heating elements. However, the provision of the support platforms is normally preferred so as to retain the heating element in a manner which is electrically safer and more appropriate in a domestic appliance. This is especially the case for the deep fryer shown in FIG. 7, because a 'normal' food container 25 used in the fryer may be quite heavy, especially when partially filled with fat and with food for cooking. The food container is integrally formed with a base 26 comprising the so-called "heatable metallic platen". Such a platen is integrally formed with a footprint 27, as defined above, to snugly fit over a shaped electrical heating element to provide good heat-exchanging contact with the heating element, in the manner described above. The container 25 is removable up and out of an outer cabinet 28 of the fryer (together with its platen base) for ease of cleaning and washing the container as required. The cabinet 28 has hinged lid 29 and the fryer has a food basket 30.

I claim:

1. A table top cooking appliance comprising:
   a base;
   a shaped electrical heating element supported above the base;
   a lid; and
   a self supporting removable heatable metallic platen having an integrally formed footprint in an undersurface thereof for snugly receiving and partially surrounding the shaped electric heating element, the platen releasably held in position by one or more clips requiring no other implement to release the platen.

2. A table top cooking appliance according to claim 1, in which the lid supports a second shaped electrical heating element and a removable heatable metallic platen which has an integrally formed footprint in a upper surface thereof for snugly receiving and partially surrounding the second shaped electrical heating element.

3. A table top cooking appliance according to claim 2, in which the two removable platens and the two shaped electrical heating elements have the same dimensions so as to be replaceable with one another respectively.

4. A table top cooking appliance according to claim 1, in which the heating element is embedded in a platform having a generally planar surface and which is formed with an upstanding channel in which the heating element fits and forms an image of the footprint to snugly receive the metallic platen in the region formed by the footprint.

5. A table top cooking appliance according to claim 1, in which the footprint is formed with a laterally arcuate surface.

6. A table top cooking appliance according to claim 1 in which the platen is made of aluminium alloy.

7. A table top cooking appliance according to claim 4, including a heat sensor having a sensing probe that is mounted in a generally central aperture formed in the platform, such that the probe can contact a surface of the platen when the platen rests on the footprint.

8. A table top cooking appliance according to claim 1, in the form of a sandwich maker.

9. A table top cooking appliance according to claim 1 in the form of deep fryer wherein the heatable platen comprises an integrally formed base of a cylindrical cooking container of the fryer.

* * * * *